June 23, 1964 H. S. STEIN ET AL 3,138,427

PRESSURE-RESPONSIVE RECORDING

Filed Dec. 23, 1959 2 Sheets-Sheet 1

INVENTORS
HERBERT S. STEIN
LEONARD K. SORGI
BY
John J. Rogan
ATTORNEY

PRESSURE-RESPONSIVE RECORDING

Filed Dec. 23, 1959 2 Sheets-Sheet 2

INVENTORS
HERBERT S. STEIN
LEONARD K. SORGI
BY
John J. Logan
ATTORNEY

United States Patent Office 3,138,427

Patented June 23, 1964

3,138,427

PRESSURE-RESPONSIVE RECORDING

Herbert S. Stein, New York, and Leonard K. Sorgi, Scarsdale, N.Y., assignors, by mesne assignments, to Litton Systems, Inc., a corporation of Maryland Filed Dec. 23, 1959, Ser. No. 861,529
17 Claims. (Cl. 346—101)

This invention relates to recorders and more especially to the visual recording of subject matter represented by electric signals.

A principal object of the invention is to provide improved methods and apparatus for translating electric signals into visual recordings of which so-called facsimile records are typical.

Another principal object is to provide a novel method and apparatus for precisionally controlling the recording pressure of a recording member on a pressure-responsive blank whereby more precise and finely detailed records can be made.

A further object is to improve the mechanism and operation of a facsimile recorder employing pressure-responsive record blanks, whereby one or a multiplicity of recorded copies can be made simultaneously.

Various types of electrical recorders have been proposed heretofore and they may be classified into two general categories, namely those of the mechanical recording kind and those of the electrosensitive recording kind. The first category would include such devices wherein the recording mark is effected by the mechanical impact of a recording hammer or tool or by projecting a spray or column of marking fluid on to the recording surface. The second category would include such devices wherein the recording is effected by an electric current or discharge acting on or through the recording surface to make a record either by heat, by electro-chemical, or even by photographic action. The second category of recorders has the draw-back that it is difficult to make more than one recorded copy at a time, although that type of recorder has the advantage of producing recorded copy of fine detail and over a relatively wide range of shade variations between black and white. The recorders of the first category have the advantage that a number of record copies can be simultaneously made, for example by using a plurality of record sheets which transfer the recording from sheet to sheet, for example by carbon paper or the like located between the various sheets. However, such recordings have not as great fineness of recording detail as those of the second category.

Accordingly one of the features of this invention is to provide a recording method and apparatus which combine the advantages of both the above categories of recorders.

Another feature relates to a novel arrangement for accurately controlling, over a wide range of values, the recording pressure of a recording element on a pressure-responsive recording surface.

Another feature relates to a recorder for electric signals, and employing a pressure-responsive surface which is acted upon by what may be termed a "free-floating" pressure device whose pressure on the said surface can be highly accurately controlled over a continuously wide range of values in response to received electric signals.

A further feature relates to a novel facsimile recorder of the intersecting edge kind, wherein one of the edges is in the form of a free-floating element arranged to be held continuously in contact with the recording surface so that substantially no marking is effected for a minimum level of received signal amplitude, and continuously graded markings can be produced over a wide range of received signal amplitudes beyond the minimum.

The invention is in the nature of an improvement on the kind of recorder and recording mechanism disclosed in U.S. application for Letters Patent, Serial No. 839,959, filed September 14, 1959. There is disclosed in said application a recorder of the kind employing a rotary platen or drum against which the recording blank is pressed under control of an elongated marking member which extends along the drum length and which forms at the same time the armature of an associated elongated electromagnet. In that application the electromagnet is designed to form in conjunction with the said drum a magnetic gap whose reluctance is varied by the movement of the said marking member, and the recording blank traverses that gap during the recording operation. In accordance with the present invention the marking mechanism is also of the elongated kind extending along the platen length but the magnetic gap, whose reluctance is varied in accordance with the movement of the marking member, is structurally and magnetically independent of the drum or platen. Consequently the electromagnet which controls the pressure of the elongated marking member on the recording blank can be designed with a compact or highly efficient magnetic gap extending along the drum or platen and there is substantially negligible magnetic interaction between the said gap and the drum. This compact and concentrated magnetic gap, in conjunction with the feature of having the elongated marking member freely movable without any restraining or normalizing members such as mechanical linkages, springs, and the like, increases the operating efficiency of the recorder.

While, as pointed out hereinabove, mechanical type recorders have the advantage of being able to produce a number of recorded copies simultaneously, the marking unit or head has necessarily been of relatively large mass and weight. Furthermore, it was necessary, because of that weight, to space the bar from the recording surface corresponding to the nonmarking or "spacing" intervals between marking signals. If not so spaced, the vibration and unavoidable variations in the surface configuration of the intersecting edge of the helix anvil carried by the scanning drum or platen, and also the unavoidable play in the mountings of the bar and its magnetic operating armature, cause undesirable striations or streakings in the recorded copy where no such markings should appear. That gives the finished recording an annoying streaked background. Furthermore, with the usual movable bar constructions the natural period of vibration of the movable system, including the bar and its associated actuating armature, in combination with the necessary linkages, usually cause the movable system to have a low natural period of vibration. To eliminate chatter, it has been necessary heretofore to damp the movable system with loading devices, such as springs or rubber contact members, but the loading generally absorbs more power than that required for the actual printing. The net result was that because of the mass of the moving system and recorder head, and because of the spacing required between the recording bar and record surface, as well as because of the necessary damping, the maximum recording speed was quite limited as compared with the other kinds of recorders. In addition, careful assembly and adjustments had to be made for satisfactory operation when replacing a recording element, and even during normal operation of the machine, in order to counteract the effects of wear and the like. These drawbacks in the mechanical category of recording apparatus of the prior art have hampered the use of that kind of equipment notwithstanding the advantages of inexpensive recording media and plural copy production.

A feature of the invention is to provide an improved magnetic configuration for the elongated marking element of a helix-bar recorder, whereby the magnetic circuit is completed independently of the rotating drum and helix, thus eliminating any tendency for the magnetic drive for the recording bar from exerting a magnetic drag on the helix or drum if the latter is made of magnetic or electrically conductive material.

In accordance with one feature of the invention the elongated marking element need not be of magnetic material but may be of any suitable light weight strip stock such as stainless steel or the like, and which may be attached to a flat strip of magnetic material, which is supported for free-floating or substantially unrestrained movement with respect to the recording blank, and with respect to the magnetic gap with which the flat strip of magnetic material cooperates. Accordingly, this gap is independent of the drum or helix and it is not necessary that the recording blank or web move through the magnetic gap. However, the elongated marking member is maintained in contact with the recording blank, by reason of the magnetic interaction between the magnetic strip and the said gap, but the pressure can be adjusted electromagnetically, so that the said contact does not result in any marking on the record blank in the absence of marking signals. It will be understood that the marking member, instead of being in continuous contact with the recording blank, may be minutely spaced therefrom when space or non-marking signals are being received. In order to limit the recordings to successive minute dots or elemental areas of the record blank, an anvil, for example in the form of a helical rib on a rotating drum or the like, is arranged on the opposite side of the blank from the marking member, to form with the marking member intersecting edges which define a small intersecting point, and between which edges the recording blank is variably pressed by the recording signals. In the well known manner, the location of this recording point of intersection is moved in synchronism with the successive elemental areas as scanned by an associated facsimile transmitter of any well known design.

A further feature relates to the novel organization, arrangement and relative location and interconnection of parts which cooperate to provide an improved facsimile recorder or the like.

In the drawing which shows, by way of example, certain embodiments,

Figures 1, 1A, 2, 6, 7:
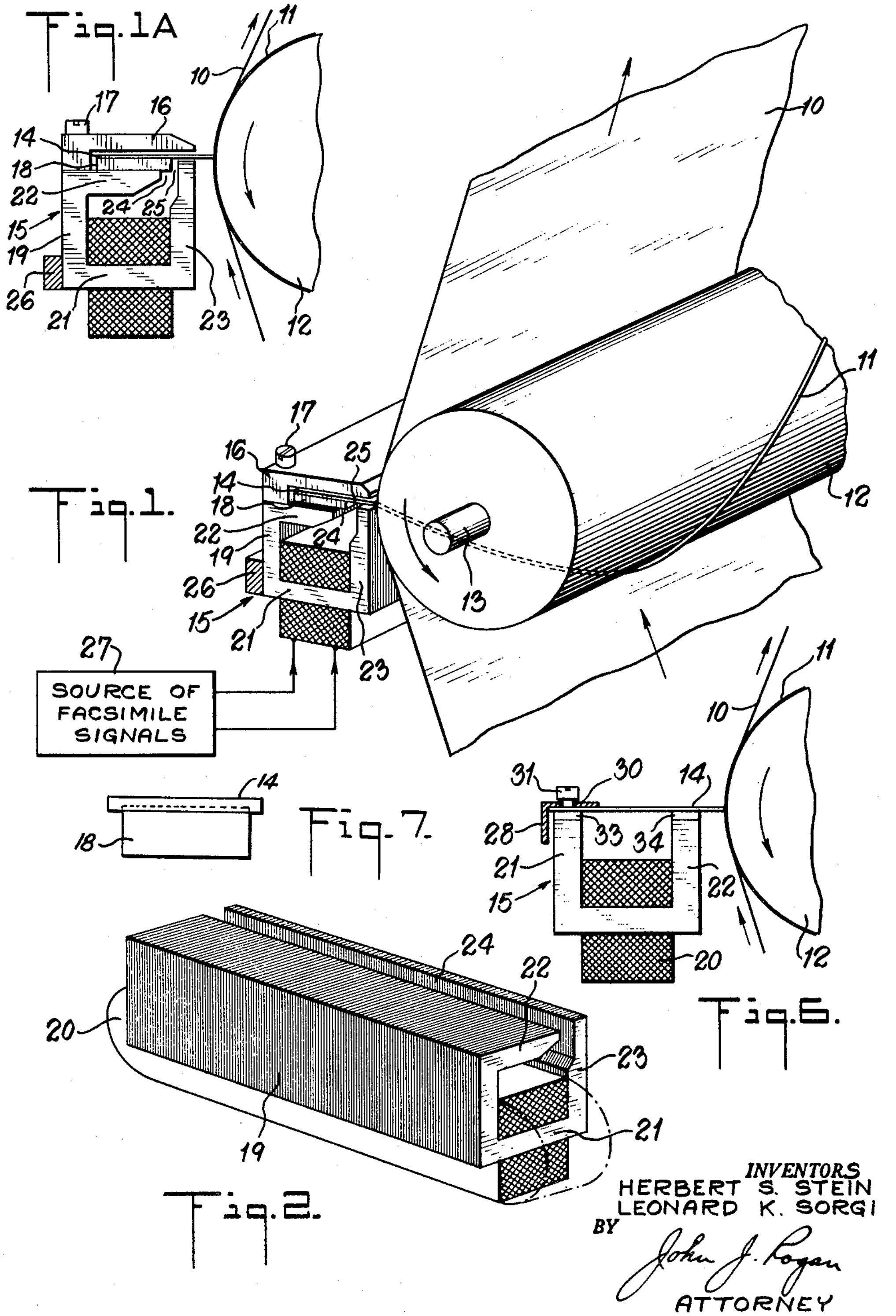
FIG. 1 is a partial perspective view of a facsimile recorder embodying the invention.
FIG. 1A is an end view of FIG. 1 to show more clearly the dimensional spaced relations between the marking member and the remaining elements of the device.
FIG. 2 is a perspective view of the magnetic circuit for actuating the marking element of the recorder.
FIG. 6 is a modification of FIGS. 3 and 4.
FIG. 7 is a further modification of the invention.

Referring to FIG. 1, there are shown the more important parts of a facsimile recorder embodying the invention. The numeral 10 represents a web or sheet of recording material of any well known kind comprising for example a flexible backing of paper or other material having its surface provided with a pressure-responsive coating. Such coatings are well known in the recording art and are usually of a kind which normally is opaque or at least non-translucent, but when subjected to pressure in localized areas the coating at those areas becomes either transparent or translucent, or may even be entirely removed to expose the contrasting color of the backing, thus producing the desired visible recorded information. Typical examples of such pressure-responsive blanks are disclosed in Harold R. Dalton U.S. Patents No. 2,313,808 and 2,313,810.

It will be understood that the web or recording blank 10 may be ordinary paper covered by a sheet of carbon transfer paper or, instead of being a single sheet, may consist of two or more similar pressure-sensitive sheets, so that as they are simultaneously subjected to pressure at the recording areas, a similar record is produced simultaneously on all the sheets. In fact, if desired the sheet 10 may be a pressure-sensitive sheet and the remaining sheets may be of ordinary paper with interleaved sheets of conventional carbon transfer paper such as is ordinarily used in making carbon copies. Merely for simplicity in the drawing, the sheet 10 is shown as a single sheet of pressure-responsive paper.

The recording sheet or blank 10 can be reeled off in the direction of the arrow from a suitable roll (not shown) so that it moves past and in engagement with the helical knife edge or rib 11 on the rotatable member 12 which may be in the form of a drum or other rotatable support for the rib 11. The member 12 is attached to a suitable driving shaft 13 which is rotated in the direction of the arrow. The blank 10 is fed, by any well known means, in the direction of the associated arrow, in fixed time relation to the rate of rotation of the member 12, as is well known in the facsimile recording art. The apex of rib 11 is arranged to intersect with the elongated marking element 14 which is preferably of non-magnetic material such for example as stainless steel and which extends along the axial length of member 12. Member 14 should be of thin stock, for example about .010 of an inch thickness, but sufficiently rigid so that when its longitudinal edge presses against the blank 10 and the rib 11, it does not distort at the point of intersection with that rib.

The blank 10, as shown, passes between the helix rib 11 and the edge of the marking member 14. The helix rib 11 constitutes an anvil behind the blank 10 and supports the blank 10 at one point across its width, this point being determined by the intersection of the helical anvil 11 and the edge of member 14. The member 14 exerts variable pressure engagement against the surface of the blank. Member 14 is freely slidably supported on the fixed electromagnetic driving unit 15 with its forward longitudinal edge extending along the surface of the helix drum 12 and parallel with the axis of that drum. The non-magnetic cover member 16, of any suitable non-magnetic metal or non-magnetic non-metallic material, can be removably fastened to the unit 15 by any suitable fastening bolts 17, and it defines with the upper face of the core of unit 15 a chamber to receive and house the marking member 14 which is carried integrally by the magnetic armature 18, serving to retain the integral members 14 and 18 in place, as for example during transportation. The outer ends of the said housing may be closed off in any suitable manner to prevent the armature and marking member from sliding longitudinally out of the housing. Armature 18 should be of rigid soft iron stock, for example of about 0.05 inch thickness and is fastened in any suitable manner, as by cementing, brazing, riveting, etc., to the underface of member 14 so as to form an integral unit therewith. The width of armature 18 is less than the corresponding width of member 14 so that the latter extends beyond the core of unit 15 into contact with blank 10. If desired, the elements 14 and 18 can be made of one piece of magnetic material. Preferably, however, they are made of two integrally joined pieces so that the element 14 can be of any suitable non-magnetic thin sheet stock.

Figures 3, 4, 5:
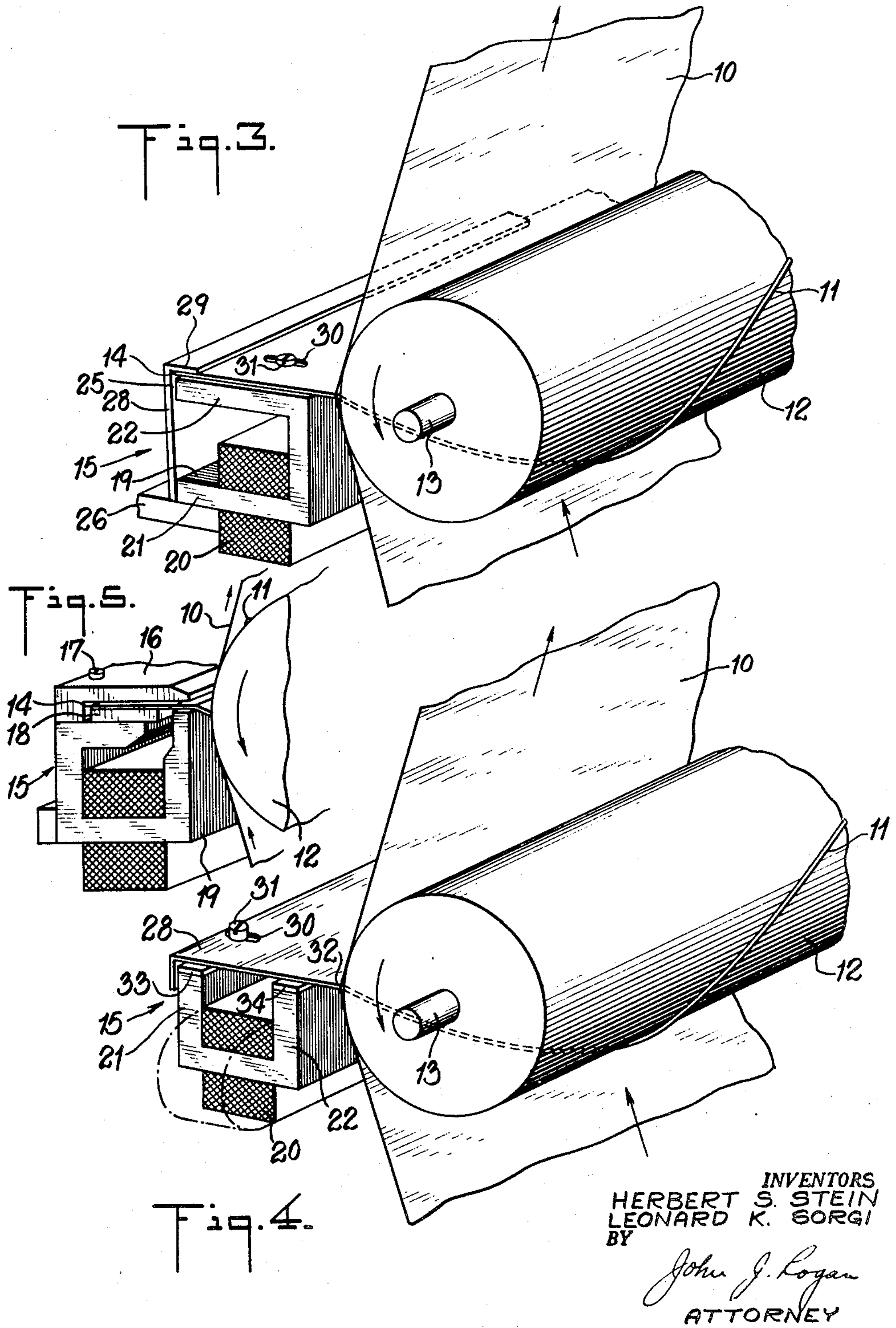
FIG. 3 is a modification of FIG. 1.
FIG. 4 is a further modification of FIG. 1.
FIG. 5 is a modification of the recording bar shown in FIGS. 1 to 4.

In the manner well known in the facsimile art, the intersection of the helix rib 11 and the forward edge of marking member 14 moves across the width of the recording blank 10 in synchronism with the corresponding scanning movement at the transmitter, and the feeding of the blank 10 forms closely spaced successive linear scanning lines along which the blank is marked at successive minute elemental areas. If desired, and as shown in FIG. 5, the forward longitudinal edge of the marking member 14 can be inclined downwardly in a direction opposite to the feeding movement of the blank 10.

The integrally united elements 14 and 18 are supported in what may be termed a free-floating manner so that they are free from the usual supporting and biasing means, such as springs, mechanical linkages and the like. For that purpose the element 18 constitutes a free-floating armature for the electromagnet 15 which, as shown more clearly in FIG. 2, has a laminated core 19 of elongated shape which preferably extends the full length of the member 14. Core 19 is provided with a magnetizing winding 20 which is wound around one of the legs of the core, for example leg 21. Therefore, the winding 20 also extends the full length of the core. The core 19 has its upper leg 22 in gapped relation to the leg 23 to form a magnetic gap 24 for example of 0.125 inch width. This gap therefore extends the full lentgh of the core. However, the width of bar 18 is such that when the edge of the marking element 14 is in non-marking contact with the blank 10, the gap 24 is partially bridged by the forward end of bar 18 to leave a minute magnetic gap 25 which may be for example of about .015 inch. The entire assembly, comprising the unit 15 with its cover plate 16 and the elements 14 and 18, can be suitably fastened to any stationary frame member 26.

As shown in the drawing, the leg 23 extends upwardly beyond the leg 22 for example a distance of about $\frac{1}{16}$ of an inch, so that when the bar 18 rests on the top flat surface of leg 22, the underface of the overhanging portion of member 14 clears the top of leg 23. The underface of the non-magnetic cover 16 is undercut to a depth which is greater than the combined thickness of elements 14 and 18, and the length of the undercutting is somewhat longer than the width of the member 14, thus allowing the elements 14 and 18 to move as a unit freely on the top flat surface of the core leg 22. In order to reduce the frictional drag between the core and the sliding armature 18, one or both of those opposed surfaces can be provided with a hard plating, such as chromium plating or the like. It will be understood, of course, that any other antifrictional or wear-resistant bearing surface may be provided between the opposed faces of element 18 and the core leg 22. Unit 15 can be attached to a fixed non-magnetic support 26. The winding 20 is arranged to be connected to any well known source 27 of facsimile signals.

From the foregoing it will be seen that the element 18 constitutes the armature for the electromagnet 15 and the amount of pressure exerted by the forward longitudinal edge of the marking element 14 on the blank 10 is controlled by the energization of the winding 20 from the source 27. The elements 14 and 18 in effect constitute a single element, and when the winding 20 is energized it urges the element 18 towards the blank so as to decrease the reluctance of the magnetic circuit in the gap 25. It should be observed that apart from the magnetic effect resulting from the energization of winding 20, the integrally united elements 14 and 18 stay put since they are free from any biasing springs or the like.

While the drawing shows the assembly constituted of the electromagnet 15, winding 20 and the slidable marking element arranged so that the element 14 is horizontal, this entire assembly, if desired, may be adjustably mounted so that the element 14 rests against the blank 10 lightly as a result of its own weight and the weight of the attached armature 18. This normal contact against the blank is so light that it does not result in any marking on the blank in the absence of any marking signals applied to the winding 20. It will be understood, of course, that the source 27 may be any well known facsimile transmitter including a movable scanning mechanism which is operated in synchronized relation with the rotation of member 12 so that the electric signals corresponding to each successive elemental area of the scanned subject matter at the transmitter, are synchronized with the location of the corresponding scanned element on the blank 10.

The foregoing described arrangement enables the received facsimile signals to control precisely the pressure of the edge of the recording bar 14 on the recording blank 10. This pressure may be varied between that necessary to produce no marking on the blank and that necessary to produce the heaviest or darkest marking so that the blank 10 can record continuous gradations of shade between the whitish and blackish. When the facsimile signals are impressed on the winding 20, the recording bar or strip 14 is urged against the surface of the blank 10, and therefore against the helical rib 11 as an anvil, to produce marking pressure of the desired value at the instantaneous scanned elemental area of the blank. When the facsimile signals are of zero or minimum amplitude corresponding to no marking, the pressure of the recording bar or strip 14 on the blank is relieved and no marking of that blank occurs. Normally, the marking strip or bar 14 remains in contact with the blank 10 at all times so that a definite minimum level of facsimile signals is required to produce a mark. In actual construction, between non-marking and marking conditions the movement of the recording bar 14 may be only a fraction of a thousandth of an inch. Of course, inf the recording is to be effected simultaneously on a series of stacked transfer sheets between the blank 10 and the rib 11, a somewhat heavier pressure may be required, and therefore this pressure may be normally adjusted depending upon the hardness or pressure responsive characteristics of the coating on blank 10, for example by adjusting the minimum energization of winding 20 and the corresponding amplitudes of the signal energizations of winding 20. By reason of the fact that the movement of the recording bar 14 is in any case a very minute value, for example less than a thousandth of an inch, and since it and the integrally united armature element 18 can be made of relatively light weight stock and unrestrained in movement, the speed of recording on the blank 10 can be greatly increased over that obtainable with conventional recorders of the helix-recording bar kind.

FIG. 3 shows a modification of the arrangement of FIG. 1. The parts of FIG. 3 which are functionally the same as those of FIG. 1 are designated by the same numerals. In this embodiment the magnetic driving unit 15 is attached to the non-magnetic supporting bar 26 and comprises a laminated U-shaped magnetic core having the core leg 21 provided with the elongated magnetizing winding 20. The legs 21 and 22 of the laminated magnetic yoke cooperate with an elongated soft iron L-shaped armature 28. The horizontal leg 29 of this armature has integrally attached thereto by cementing, brazing, riveting or the like, the thin elongated or strip-like non-magnetic marking bar 14 above described which is adapted to press against the recording blank 10 as described. The member 14 rests for free sliding movement on the upper flat ground face of the core leg 22. In order to prevent accidental dislodgment, the member 14 may be provided with a series of slots 30 which register with cooperating pins 31 fastened to the core leg 22. However, this slot pin arrangement is such so as not to offer any appreciable frictional drag on the sliding movement of member 14 on the core leg. The member 14 is of non-magnetic material and its width is such that when its forward edge is in contact with the blank 10, a minute magnetic gap 25 exists between the armature 28 and the legs 21 and 22 of the magnetic core. The action of this device in recording by pressure on the blank 10 is similar to that above described in connection with FIG. 1, it being understood that the winding 20 is energized from any well known source of facsimile signals such as the source 27.

FIG. 4 shows a still further modification which is similar to that of FIG. 3 except that the laminated U-shaped magnetic core comprised of the yoke 21 and the legs 19 and 23 is so disposed that the L-shaped magnetic armature 28 rests on and slides along the upper flat ends of the legs 21 and 22. In this embodiment the L-shaped armature 28 may be made of one piece so that the forward longitudinal edge 32 presses against the recording blank to act as the marking element. It will be understood, of course, that if desired, instead of constituting the armature 28 of a single piece so that it also acts as the marking element, it may be formed with a recording strip or bar 14 of non-magnetic material attached to the armature 28 as indicated in FIG. 6. In the embodiments of both FIGS. 4 and 6, the upper flat faces of the core legs 19 and 23 are provided with non-magnetic spacer strips 33, 34 across the entire length of the core. In this construction the magnetic yoke also holds the armature in firm contact with the top surface of spacers 32 and 33.

Various changes and modifications may be made in the disclosed embodiments without departing from the spirit and scope of the invention. Thus it is not necessary that the armature element 18 be of the same length as the marker element 14. The latter element 14 may be somewhat greater in length than the armature element so as to adapt the marking element to blanks of different widths. In all cases as shown in FIG. 7, however, the armature marker element should be freely supported as hereinabove described.

Features disclosed herein but not claimed are claimed in copending application of Austin G. Cooley, Serial No. 839,959, filed September 14, 1959, and in the application of Leonard K. Sorgi, Serial No. 861,528 filed on even date herewith.

What is claimed is:

1. A recorder comprising means to move a recording blank past a recording point, means to subject the blank at the recording point to a signal-controlled pressure to mark the blank correspondingly, the last mentioned means including a backing member for the blank, an electromagnet having a core with a magnetic gap extending substantially along one dimension of the blank which gap however is located entirely adjacent only one face of the blank during recording, a magnetizable armature bridging said gap to be moved in accordance with signal energizations of said electromagnet, said armature carrying an elongated blank-marking edge also extending substantially along said blank dimension, and slidably supported on said core, and defining with said core a substantially closed magnetic circuit.

2. A recorder according to claim 1 in which said magnetic gap extends substantially linearly and parallel to the said dimension of the blank.

3. A signal controlled marking mechanism for electric signal recorders and the like, comprising a pair of members defining pressure jaws of elemental area and between which a recording blank is arranged to be moved, one of said members being a backing anvil and the other an elongated bar which extends across substantially the entire recording width of said blank, a stationarily mounted magnetic core having a single elongated magnetic gap extending parallel to the surface of the blank which gap is located entirely adjacent only one face of the blank, a magnetic armature carrying said bar, means including a flat bearing surface supporting said armature in said gap for sliding bodily motion toward and away from the opposed surface of said blank and a magnetizing winding for said core and arranged to be energized by recording signals and to move said armature and said bar to variably bridge said gap and thereby to subject said blank to signal controlled pressure at each elemental recording point.

4. A signal controlled marking mechanism for electric signal recorders and the like, comprising a platen-like backing for a recording blank, a stationarily mounted electromagnet having an elongated linear magnetic gap which is located entirely adjacent only one face of the blank and which extends along said backing substantially parallel thereto, an elongated armature bridging said gap throughout substantially its entire length, means mounting said armature for bodily sliding motion on said electromagnet towards said blank, said armature having an elongated recording edge arranged to subject said blank to variable pressure in accordance with signal energizations of said electromagnet and being substantially entirely free from any mechanical restraint affecting its sliding motion.

5. A signal controlled marking mechanism for electric signal recorders and the like, comprising a platen-like backing for a recording blank, an electromagnet having a core with a magnetic gap extending along one dimension of the blank, means magnetically bridging said gap so that the lines of magnetic force are substantially entirely diverted from said backing, the last mentioned means including an elongated flat magnetizable armature extending along the length of the gap and having a corresponding elongated recording edge which engages said blank across said dimension and which variably bridges said gap for subjecting the blank to signal controlled pressure at elemental areas thereof.

6. A signal controlled marking mechanism according to claim 5 in which said armature carries a non-magnetic strip which defines said elongated recording edge, said armature being mounted on said core and being substantially entirely free from mechanical restraining connections during its gap bridging motion.

7. A facsimile recorder comprising a blank-scanning member having an anvil, a cooperating elongated blank-marking unit which intersects said anvil to define an elemental scanning spot and having an elongated linear edge for engaging a recording blank with variable pressure thereon, said marking unit extending substantially across the recording width of the blank, means to produce relative motion between said anvil and marking unit to scan the blank in successive elemental spots defined by the intersection of said marking unit and anvil, an electromagnet structure having a core defining an elongated magnetic gap substantially coextensive with the length of said marking unit, said magnetic gap being located adjacent only one face of the blank and forming with said core a closed magnetic circuit which is independent of said anvil, said marking unit including an elongated magnetic bar which forms the armature of said electromagnet and which variably bridges said gap in response to signal energizations of said electromagnet, said marking unit being substantially entirely free from mechanical restraining connections affecting its gap bridging motion.

8. A recorder according to claim 7 in which said marking unit includes an elongated flat magnetic bar which overlies said gap and is slidably supported on a flat surface of said core.

9. A recorder according to claim 7 in which said marking unit has a smoothly polished surface and said marking unit slides on a corresponding smoothly polished surface carried by said electromagnet, said marking unit being substantially entirely free from mechanical biasing means whereby the movement of said unit is controlled substantially entirely by the magnetic lines of force in said gap.

10. A recorder according to claim 8 in which said marking unit is formed in part of non-magnetic material which is integrally carried by another portion of magnetic material to constitute said armature.

11. A signal controlled marking mechanism for electric signal recorders and the like, comprising a platen-like backing for a recording blank, a stationarily mounted electromagnet having a core with an elongated magnetic gap extending along one dimension of the blank and located adjacent only one face of said blank, said core defining a substantially complete magnetic circuit which is independent of said platen, an armature and blank-marking device, and means slidably mounting said device on the core, said armature and core having their respective bearing surfaces smoothed, and said armature being substantially entirely free from any mechanical restraining connections affecting its sliding motion.

12. A signal controlled marking mechanism according to claim 11 in which said armature and blank-marking device comprises a magnetic portion which bridges said gap and an edge portion of reduced thickness for engaging said blank along a line of elemental thinness.

13. A recorder according to claim 7 in which said electromagnet has a substantially U-shaped core and said marking unit is mounted for free sliding motion on at least one of the core legs.

14. A recorder according to claim 7 in which said electromagnet has a substantially U-shaped core, and said marking unit is mounted for free sliding movement on smooth bearing surfaces of non-magnetic material attached to the core legs.

15. A recorder according to claim 7 in which said marking unit comprises a magnetic portion which constitutes the armature of the electromagnet, and a non-magnetic edge portion of reduced thickness for engaging said blank along a line of elemental thinness.

16. A facsimile recorder comprising a platen for supporting a recording blank during recording, a blank-marking mechanism for marking said blank in elemental areas, said marking mechanism including an elongated electromagnet structure extending along the length of the platen, said electromagnet structure having a corresponding elongated magnetic core defining a substantially complete magnetic circuit except for a narrow magnetic gap extending longitudinally of the core and parallel to the platen and with said platen being magnetically separate from said magnetic circuit, an armature carrying a blank marking edge and slidably mounted on the core and extending substantially along said gap and partially bridging said gap whereby signal energizations applied to said winding cause said armature to vary its extent of overlap of said gap and thereby to cause said edge to exert corresponding variable pressures on the recording blank at each elemental area thereof, said armature being substantially entirely free from any mechanical restraining connections affecting its sliding motion.

17. A recorder comprising means for supporting and feeding a recording blank, and marking mechanism for marking said blank, said marking mechanism including an elongated electromagnet extending across the width of said blank and having a magnetizable core of substantially U-shaped cross section throughout forming a magnetic circuit having a gap, said core being provided at the top with a substantially flat bearing surface adjacent said gap, a slidable armature for said electromagnet resting on and supported by said bearing surface and bridging the gap in said core, and an elongated rectilinear marking edge on said armature and positioned to engage the surface of said blank upon predetermined energization of said electromagnet.

References Cited in the file of this patent

UNITED STATES PATENTS

| | | |
|---|---|---|
| 2,484,298 | Krahulec | Oct. 11, 1949 |
| 2,646,518 | Thompson | July 21, 1953 |
| 2,785,039 | Artzt | Mar. 12, 1957 |
| 2,906,582 | Page | Sept. 29, 1959 |

OTHER REFERENCES

Textbook: "Magnets," Underhill, 1924, page 58.